United States Patent
Hein et al.

(10) Patent No.: US 8,242,735 B2
(45) Date of Patent: Aug. 14, 2012

(54) METHOD AND SYSTEM FOR TEMPERATURE-BASED POWER CONVERTER CONTROL

(75) Inventors: Bruce H. Hein, East Peoria, IL (US); Thomas M. Sopko, East Peoria, IL (US); Gregory J. Speckhart, Peoria, IL (US); Jackson Wai, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 1070 days.

(21) Appl. No.: 12/216,668

(22) Filed: Jul. 9, 2008

(65) Prior Publication Data

US 2010/0007300 A1    Jan. 14, 2010

(51) Int. Cl.
  *H02P 23/14* (2006.01)
  *H02P 5/50* (2006.01)
(52) U.S. Cl. ........................... 318/807; 318/798
(58) Field of Classification Search .......... 318/798–801, 318/807, 812
  See application file for complete search history.

(56) References Cited

U.S. PATENT DOCUMENTS

| | | | |
|---|---|---|---|
| 4,366,427 A | 12/1982 | Walker et al. | |
| 4,371,823 A | 2/1983 | Lohest | |
| 4,468,725 A | 8/1984 | Venturini | |
| 4,757,240 A | 7/1988 | Mizobuchi et al. | |
| 4,833,387 A | 5/1989 | Pfeiffer | |
| 5,208,524 A | 5/1993 | Kono et al. | |
| 5,350,992 A | 9/1994 | Colter | |
| 5,880,574 A | 3/1999 | Otsuka et al. | |
| 6,191,676 B1 | 2/2001 | Gabor | |
| 6,346,785 B1 * | 2/2002 | Dainez et al. | 318/400.01 |
| 6,690,139 B1 | 2/2004 | Seibel | |
| 6,979,968 B2 * | 12/2005 | Nagashima et al. | 318/268 |
| 7,221,121 B2 | 5/2007 | Skaug et al. | |
| 7,898,198 B2 * | 3/2011 | Murphree | 318/432 |
| 2005/0073272 A1 * | 4/2005 | Nagashima et al. | 318/268 |
| 2005/0219883 A1 | 10/2005 | Maple et al. | |
| 2007/0001636 A1 * | 1/2007 | Murphree | 318/432 |
| 2007/0114965 A1 | 5/2007 | Kutsuna et al. | |
| 2007/0176575 A1 | 8/2007 | Nawa et al. | |
| 2008/0094762 A1 | 4/2008 | Ochiai | |
| 2009/0069142 A1 * | 3/2009 | Welchko et al. | 475/276 |

\* cited by examiner

*Primary Examiner* — Eduardo Colon
(74) *Attorney, Agent, or Firm* — Finnegan, Henderson, Farabow, Garrett & Dunner LLP

(57) ABSTRACT

A method of controlling a power converter in an electric drive machine is disclosed. The method may include determining a first switching frequency and determining a second switching frequency. The method may also include comparing the first switching frequency and the second switching frequency. The method may further include selecting a power converter switching frequency from the lesser of the first switching frequency and the second switching frequency to control a power converter.

14 Claims, 4 Drawing Sheets

METHOD AND SYSTEM FOR TEMPERATURE-BASED POWER CONVERTER CONTROL

TECHNICAL FIELD

This application relates to a power converter control method, and more particularly, to a control method for the switching frequency to reduce overheating of the power converter.

BACKGROUND

Power converters/inverters are commonly used in a machine for motor control. Power converters/inverters usually include a plurality of power transistors, and these power transistors may be switched on and off to modulate an output voltage from the power converter/inverter. Examples of power transistors may include bipolar junction transistors (BJT), the Darlington device, metal oxide semiconductor field effect transistors (MOSFET), and insulated gate bipolar transistors (IGBT). In particular, IGBTs have been widely used in a range of applications due to their high switching speed and ability of conducting very high current.

High voltage power converters/inverters are usually expensive, and failure of power transistor components can be costly. Power converters/inverters often fail because of thermal overload. The thermal overload is often caused by either exceeding a maximum switching frequency or exceeding a maximum current limit. A conventional power converter's/inverter's switching frequency is determined based on the rotor speed. As the rotor speed increases, so does the switching frequency, and at high rotor speeds, a thermal overload is possible. Additionally, in the event that there is a malfunction in the power transistors or the wiring, damage may be caused to other power components in the circuit. Therefore, a protection strategy is needed to prevent thermal overload, particularly from exceeding a maximum switching frequency or exceeding a maximum current.

A device and method for dynamically optimizing a power converter in an electric machine is described in U.S. Patent Publication No. 2005/0219883 to Maple et al. ("the '883 publication"). The '883 publication describes a dynamically optimized power converter unit that increases efficiency of one or more power converters supplying energy to a load. The device or method may select a starting frequency. The starting frequency may be a preprogrammed maximum allowed frequency, or may be selected from a lookup table based on of the output power. An efficiency is calculated for the selected starting frequency. The frequency is then decremented, and the efficiency is calculated and compared to the efficiency at the previously calculated frequency. When the efficiency no longer needs to be increased, the previous frequency is the optimal switching frequency. At medium power levels the switching frequency is used to control the efficiency of the power converters. At high power levels, two or more power converters may be used to share the load. The temperature is measured as the criteria for power sharing, because temperature is a good indicator of power dissipation and may be used to balance two power converters sharing a load.

Although the device and method of the '883 publication may provide a dynamically configured power converter that may increase efficiency in some cases, it may include several disadvantages. Specifically, the device and method of the '883 publication may attempt to limit thermal overload by searching for an efficient switching frequency and using more than one power converter to share the power provided to the load. The complexity and cost of the control circuit and the power converters may be increased. Because the '883 publication iteratively searches for a switching frequency, a more sophisticated processor may be required, which may increase costs. Additionally, because the device and method of the '883 publication adjust the switching frequency to increase efficiency, and at high power may use two or more power converters and balance the power sharing between the two or more power converters as a function of power converter temperature, the maximum current is not directly controlled. Thus, in order to provide increased thermal protection, a method and system may be needed that provide both thermal overload protection as a result of exceeding a maximum switching frequency and/or exceeding a maximum current.

The disclosed method and system are directed to improvements in the existing technology.

SUMMARY

In accordance with one aspect, the present disclosure is directed toward a method of controlling a power converter in an electric drive machine. The method may include determining a first switching frequency and determining a second switching frequency. The method may also include comparing the first switching frequency and the second switching frequency. The method may further include selecting a power converter switching frequency from the lesser of the first switching frequency and the second switching frequency to control the power converter.

According to another aspect, the present disclosure is directed toward a system for selecting a switching frequency for a power converter in an electric drive machine. The system may include at least one power converter configured to provide power to at least one electric machine. The system may further include a controller electrically coupled to the at least one power converter. The controller may be configured to determine a first switching frequency and determine a second switching frequency. The controller may also be configured to compare the first switching frequency and the second switching frequency. The controller may be further configured to select a power converter switching frequency from the lesser of the first switching frequency and the second switching frequency to control the at least one power converter.

In accordance with yet another aspect, the present disclosure is directed toward an electric drive machine. The machine may include a power source, at least one electric machine, each electric machine having at least one phase and a rotor speed sensor associated with each electric machine, and at least one power converter, each power converter having at least one phase and a sensor associated with each phase. The machine may also include a controller electrically coupled to the at least one power converter. The controller may be configured to determine a first switching frequency and determine a second switching frequency. The controller may also be configured to compare the first switching frequency and the second switching frequency. The controller may be further configured to select a power converter switching frequency from the lesser of the first switching frequency and the second switching frequency to control the at least one power converter.

DETAILED DESCRIPTION

Figure 1:
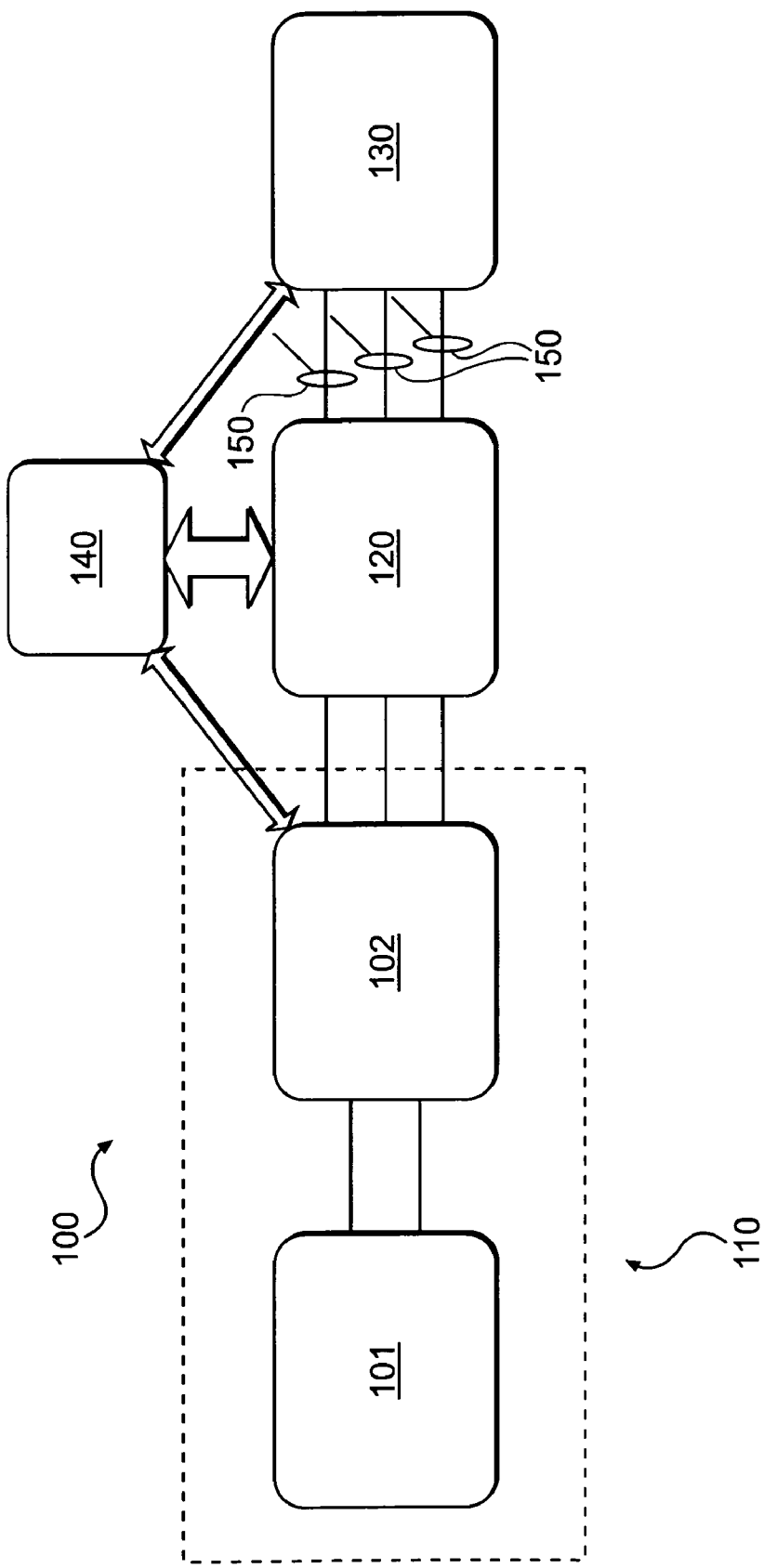
FIG. 1 provides a block diagram of a machine in accordance with an exemplary embodiment of the present disclosure.

FIG. 1 provides a block diagram of a machine in accordance with an exemplary embodiment of the present disclosure. Machine 100 may include, among other things, a power source 110, a power electronics system 120, a traction system 130, and a control system 140. Machine 100, as the term is used herein, refers to a fixed or mobile machine that may perform some type of operation associated with a particular industry, such as mining, construction, farming, etc. Examples of machines include trucks, cranes, earth moving vehicles, mining vehicles, backhoes, material handling equipment, farming equipment, and on-highway vehicles.

Power source 110 may include various components configured to provide electric power for use by one or more systems of machine 100. Power source 110 may include a prime mover 101 and a generator 102 driven by prime mover 101. Prime mover 101 may be a combustion engine, such as, for example, a diesel engine, or may be a hybrid engine. Generator 102 may be an AC generator, or otherwise known as an alternator, that generates alternating voltage by rotating a coil in the magnetic field or by rotating a magnetic field within a stationary coil. Alternatively, power source 110 may include any other suitable device for providing an electrical power output such as, for example, a battery, a fuel cell, or any other type of power source configured to provide electrical power to machine 100.

Power electronics system 120 may include at least one power converter. Examples of power converters may include a power inverter that converts DC current to AC power and a power rectifier that converts AC current to DC power. Each power converter may have at least one phase and each phase may include at least one power transistor. Each power transistor may be switched on and off by its corresponding gate driving circuit. For the purpose of illustration, IGBT transistors will be discussed in the present disclosure. The power transistors may be switched according to a switching scheme, such as a pulse width modulation (PWM), to modulate the voltage that is output from the power converter.

Power electronics system 120 may be electrically coupled to power source 110 via a first set of conductors, and to traction system 130 via a second set of conductors. Traction system 130 may include at least one load, such as an electric motor and/or an electric generator. Hereinafter, the electric motor and/or electric generator may be referred to as an electric machine. Power electronics system 120 may be configured to convert power provided by power source 110 into power forms appropriate for consumption by traction system 130. Power electronics system 120, for example, may include a power rectifier to convert AC voltage supplied by power source 110 to a DC voltage output, and may further include a power inverter to convert the DC voltage to an AC voltage of a certain waveform. In another exemplary embodiment, power electronics system 120 may include a power inverter to convert DC voltage to an AC voltage of a certain waveform. Power electronics system 120 may provide voltage and/or current outputs to drive traction system 130 and/or control system 140.

Traction system 130 may include at least one load. The at least one load may be directly coupled to power source 110, or may be coupled to power source 110 via the power electronics system 120. Each load may have at least one phase and may be connected with a power converter with equal number of phases in the power electronics system 120. One example of the load may be an electric machine, such as an AC induction motor, a brushless DC motor, a stepper motor, a linear motor, or any other type of motor or generator.

Control system 140 may be coupled to power electronics system 120 and configured to provide gate driving signals to the power transistors based on a pre-programmed switching scheme. Control system 140 may be included as an integral part of power electronics system 120, or, alternatively, control system 140 may be external to power electronics system 120, for example, as part of a separate electronic control module (ECM) associated with machine 100. Control system 140 may also be coupled to traction system 130, and/or power source 110 to perform one or more control functions. Control system 140 may further be configured to receive feedback from a plurality of points in the circuit and adjust the control signals based on the feedback. For example, control system 140 may be configured to communicate with sensors 150 associated with the power electronics system 120, determine appropriate control signals based on sensor 150 measurements, and send the control signals to power electronics system 120.

When high voltage is applied to machine 100, thermal overload, particularly from exceeding a maximum switching frequency or exceeding a maximum current of the power converter in power electronics system 120, may cause irregular or uncontrolled output from the power converter. The irregular or uncontrolled output from the power converter may damage other power components connected in the circuit. For example, power source 110 and/or traction system 130 may contain highly sensitive electronic circuits, which may be damaged by an over-current condition.

Control system 140 may be configured to determine one or more switching frequencies and select the lowest switching frequency. According to one embodiment, control system 140 may be configured to determine a first switching frequency for each power converter based on either the current drawn through the power converter or the torque of the electric machine of machine 100. Control system 140 may be configured to determine a second switching frequency for each power converter based on the rotor speed of the electric machine of machine 100. Control system 140 may be further configured to select a power converter switching frequency from the lesser of the first switching frequency and the second switching frequency for each power converter. Control system 140 may also save the first switching frequency and the second switching frequency to a memory device.

Machine 100 may include one or more sensors 150 deployed among power source 110, power electronics system 120, and traction system 130. Sensors 150 may detect or observe one or more operational conditions of machine 100, and may report those operational conditions as an analog or discrete value to control system 140 or other controllers on machine 100. In one exemplary embodiment, sensors 150 may be deployed to detect the torque, current, or rotor speed of an electric machine, and automatically report the detected values to control system 140. In another example, each power converter may have at least one phase and incorporate at least one sensor 150 in series to monitor the driving current in that phase. Sensors 150 may provide information on an operational condition, such as, for example, the magnitude of a current, the frequency of a current (if the current is an AC current), the polarity of the current, and a complete profile of the current as a function of time or frequency. Similarly, information on the torque and/or rotor speed may be detected and provided by sensors 150 for each power converter and electric machine. Sensor 150 measurements may be indicative of the characteristics of the loads that power electronics system 120 drives, for example, traction system 130.

Figure 2:
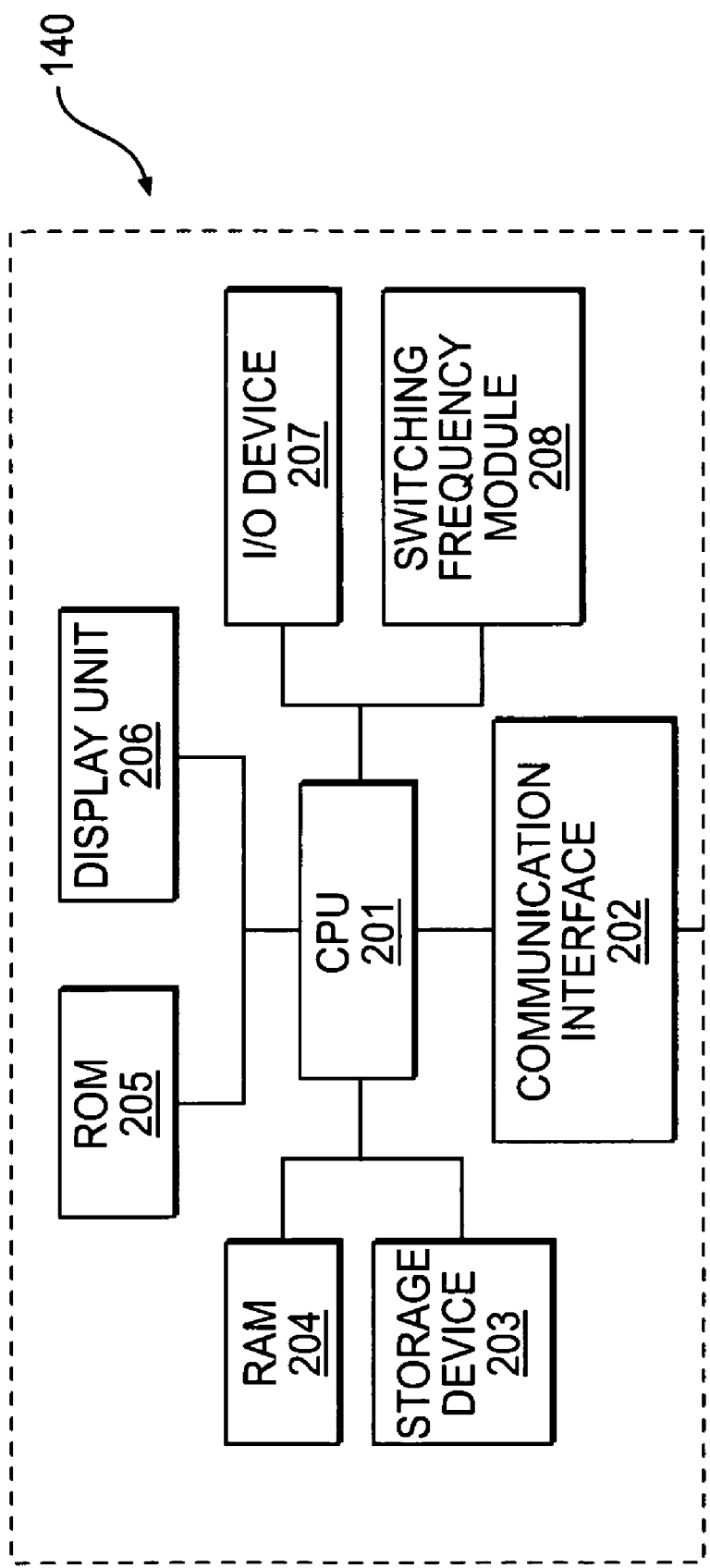
FIG. 2 provides a diagrammatic illustration of a control system, in accordance with an exemplary embodiment of the present disclosure.

FIG. 2 provides a diagrammatic illustration of a control system 140, in accordance with an exemplary embodiment of the present disclosure. As illustrated in FIG. 2, control system 140 may include one or more hardware components and/or software applications that cooperate to monitor, analyze, and/or control performance or operation of one or more machines 100. Control system 140 may include any computing system configured to receive, analyze, transmit, and/or distribute performance data associated with machine 100.

Control system 140 may include hardware and/or software components that perform processes consistent with certain disclosed embodiments. For example, as illustrated in FIG. 2, control system 140 may include a central processing unit (CPU) 201; a communication interface 202; one or more computer-readable memory devices such as storage device 203, a random access memory (RAM) 204, and a read-only memory (ROM) 205; a display unit 206; an input/output (IO) device 207; and/or a switching frequency module 208. The components described above are exemplary and not intended to be limiting. Furthermore, it is contemplated that control system 140 may include alternative and/or additional components than those listed above.

CPU 201 may be one or more processors that execute instructions and process data to perform one or more processes consistent with certain disclosed embodiments. For instance, CPU 201 may execute software that enables control system 140 to request and/or receive performance data from sensors 150 on machine 100. CPU 201 may also execute software that stores collected performance data in storage device 203. In addition, CPU 201 may execute software that enables control system 140 to analyze performance data collected from machine 100 and determine one or more switching frequencies for one or more power converters of power electronics system 120. According to one embodiment, CPU 201 may access computer program instructions stored in memory. CPU 201 may then execute sequences of computer program instructions stored in computer-readable medium devices such as, for example, a storage device 203, RAM 204, and/or ROM 205 to perform methods consistent with certain disclosed embodiments, as will be described below.

Communication interface 202 may include one or more elements configured for two-way data communication between control system 140 and remote systems (e.g., machines 100, machine management systems) via a transceiver device (not shown). For example, communication interface 202 may include one or more modulators, demodulators, multiplexers, demultiplexers, network communication devices, wireless devices, antennas, modems, or any other devices configured to support a two-way communication interface between control system 140 and remote systems or components.

One or more computer-readable medium devices may include storage devices 203, a RAM 204, ROM 205, and/or any other magnetic, electronic, flash, or optical data computer-readable medium devices configured to store information, instructions, and/or program code used by CPU 201 of control system 140. Storage devices 203 may include magnetic hard-drives, optical disc drives, floppy drives, flash drives, or any other such information storing device. RAM 204 may include any dynamic storage device for storing information and instructions by CPU 201. RAM 204 also may be used for storing temporary variables or other intermediate information during execution of instructions to be executed by CPU 201. During operation, some or all portions of an operating system (not shown) may be loaded into RAM 204. In addition, ROM 205 may include any static storage device for storing information and instructions by CPU 201.

Display unit 206 may include a display including a graphical user interface (GUI) for outputting information on a monitor. Display unit 206 may include one or more displays that may be useful in testing and/or troubleshooting control system 140 and/or switching frequency module 208. I/O device 207 may include one or more components configured to communicate information associated with control system 140. For example, I/O device 207 may include an integrated keyboard and mouse to allow a user to input commands or instructions for control system 140. I/O devices 207 may include one or more peripheral devices, such as, for example, printers, cameras, disk drives, microphones, speaker systems, electronic tablets, or any other suitable type of I/O device 207.

Control system 140 may include a hardware or software switching frequency module 208 configured to receive/collect certain performance data from sensors 150, and determine, based on the received performance data, one or more switching frequencies for one or more power converters. Switching frequency module 208 may be configured to determine a first switching frequency for each power converter based on either the current drawn through the power converter or the torque of the electric machine of machine 100. Switching frequency module 208 may be configured to determine a second switching frequency for each power converter based on the rotor speed of the electric machine of machine 100. Switching frequency module 208 may be further configured to select a power converter switching frequency from the lesser of the first switching frequency and the second switching frequency for each power converter. Switching frequency module 208 may also save to a storage device 203 the first switching frequency and the second switching frequency.

Figure 3:
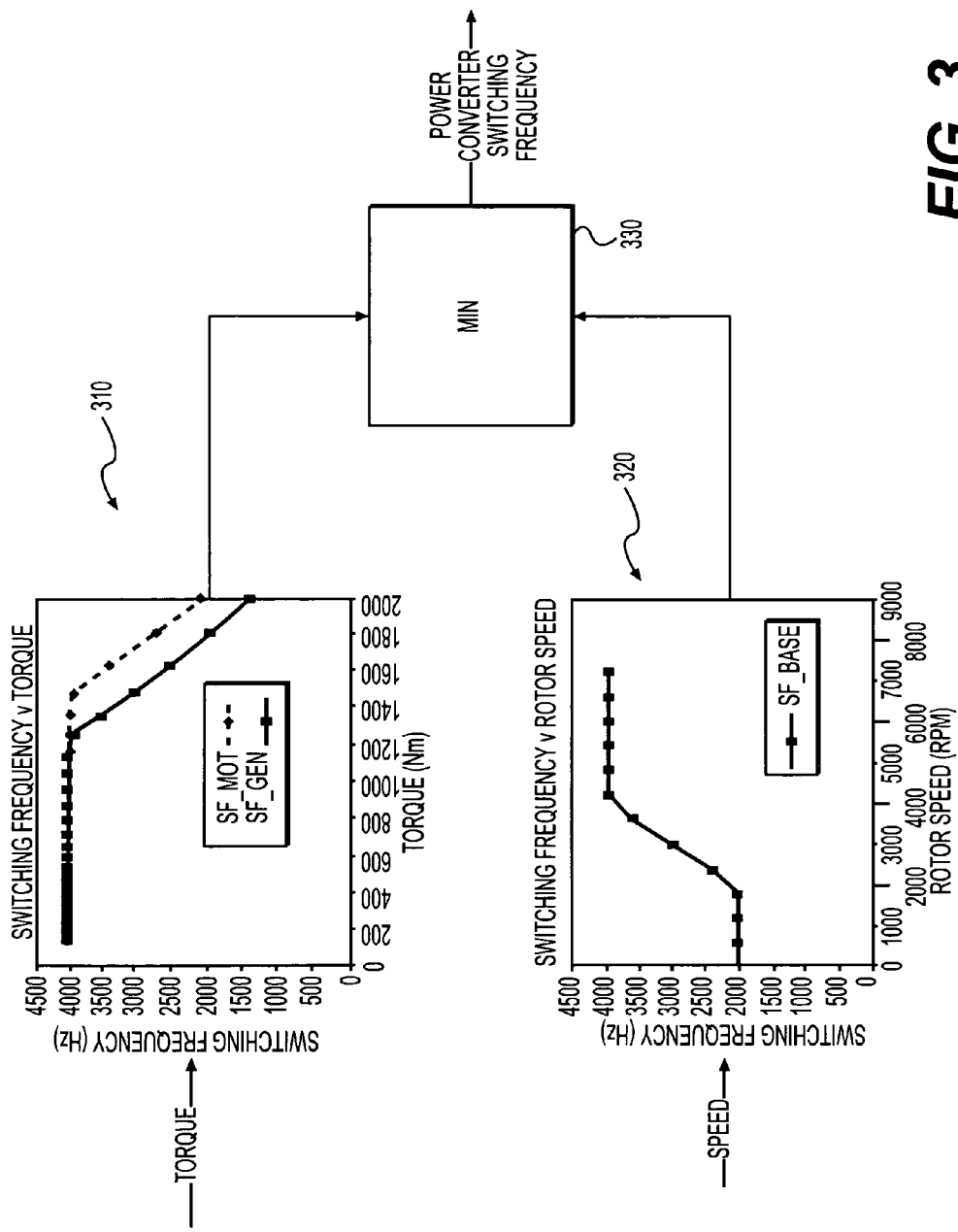
FIG. 3 provides a diagrammatic illustration of the power converter switching frequency being set as the lesser of the first switching frequency and the second switching frequency, in accordance with an exemplary embodiment of the present disclosure.

FIG. 3 provides a diagrammatic illustration of a map of the switching frequency versus torque and a map of the switching frequency versus rotor speed of a power converter, and the combination of those maps, in accordance with an exemplary embodiment of the present disclosure. As illustrated in FIG. 3, a two-dimensional map 310 of the torque versus switching frequency and a two-dimensional map 320 of the rotor speed of an electric machine versus switching frequency are used to determine a first switching frequency, and a second switching frequency, respectively. The first switching frequency and the second switching frequency are then compared, and the lesser valued switching frequency is set as the power converter switching frequency. The combination of two-dimensional map 310 and two-dimensional map 320 create a three-dimensional space in which the z-axis is the switching frequency.

Two-dimensional map 310 of the torque versus switching frequency shows an exemplary map of torque versus switching frequency. The torque or current may be determined from the system operating conditions. For the motoring side, the torque or current may be measured or estimated from the speed regulator of the motor in the power electronics system 120. For the generator side, the toque or current may be measured or estimated from the voltage controller of the generator in power electronics system 120. The torque may be a direct function of the current, and the torque may be proportional to the current. The switching frequency associated with each torque or current value may be based on the thermal limits of the power converter. As the torque or current increases, the first switching frequency may start to decrease. In one exemplary embodiment, separate two-dimensional maps 310 may be provided for motoring torque or current, and generator torque or current.

Two-dimensional map 320 of the rotor speed of an electric machine versus switching frequency shows an exemplary map of rotor speed versus switching frequency. The rotor speed may be determined from the fundamental frequency (speed) of the rotor. The larger the fundamental frequency of the rotor, the larger the switching frequency to maintain enough bandwidth for control of the power converter by control system 140. As the rotor speed increases, the second switching frequency may start to increase.

Figure 4:
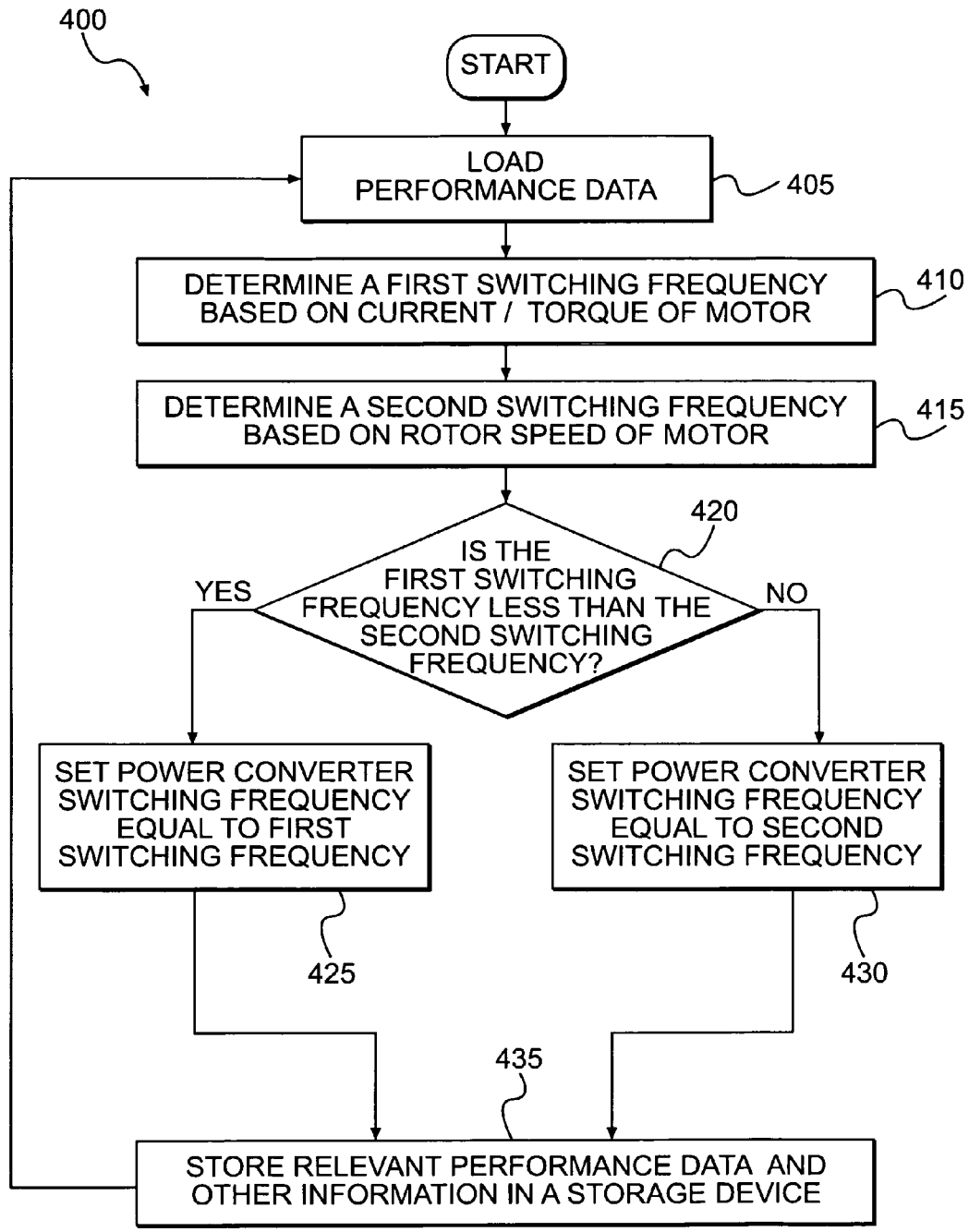
FIG. 4 provides a flowchart of an exemplary method for determining a power converter switching frequency, in accordance with an exemplary embodiment of the present disclosure.

Control system 140, shown in FIG. 3 as box 330, may set the power converter switching frequency as the lesser of the first switching frequency and the second switching frequency. The resulting control curve for the switching frequency may be bell shaped, wherein at low rotor speeds the power converter switching frequency is smaller, and at high torque/current the power converter switching frequency is again smaller. FIG. 4, which provides a flowchart 400 to illustrate an exemplary method to determine a power converter switching frequency that may be performed by control system 140, may implement the system or method illustrated in FIG. 3.

FIG. 4 illustrates a flowchart 400 depicting an exemplary method for determining a power converter switching frequency based on selecting the lower of a switching frequency based on the current/torque and a switching frequency based on the rotor speed of an electric machine. As illustrated in FIG. 4, performance data may be collected from at least one power converter and at least one electric machine on a machine 100 (Step 405). For example, switching frequency module 208 of control system 140 may receive/collect performance data from each power converter in power electronics system 120. Switching frequency module 208 may also collect from each electric machine one or more of the actual, commanded, and/or expected currents and/or torques. The actual, commanded, and/or expected currents and/or torques may be from the motoring side, such as from the speed regulator, and/or the generating side, such as from the voltage controller. Switching frequency module 208 may further collect from each electric machine one or more of the actual, commanded, or expected rotations per minute (RPM), or some other measure of the rotation speed of the electric machine. According to one embodiment, switching frequency module 208 may automatically receive this data from a performance diagnostic system that may be monitoring one or more systems on machine 100. Alternatively or additionally, switching frequency module 208 may provide a data request to each sensor 150 or performance diagnostic system and receive performance data from each sensor 150 or performance diagnostic system in response to the request.

Once performance data has been collected, the first switching frequency may be determined, based on one of the currents or torques of the electric machine collected with the performance data (Step 410). According to one embodiment, after collection of performance data, switching frequency module 208 may determine a first switching frequency based on the current or torque of an electric machine. In one exemplary embodiment, for example, switching frequency module 208 may determine a first switching frequency based on the actual, commanded, or expected torque collected from an electric machine. In another exemplary embodiment, switching frequency module 208 may determine a first switching frequency based on the actual, commanded, or expected current collected from an electric machine. The determination may be calculated based on a formula or model of an electric machine. The model may have been generated during commissioning of machine 100, may be a standard model for the sort of electric machine used, or may be a model updated by control system 140 as the performance of the electric machine changes. In another example, switching frequency module 208 may determine a first switching frequency of an electric machine from a two-dimensional map 310 in storage device 203, based on the data collected in step 405, including either a torque applied to the electric machine or a current of the electric machine. In a further exemplary embodiment, there may be two two-dimensional maps 310, one for motoring torque or current versus switching frequency, and one for generating torque or current versus switching frequency. It is contemplated that switching frequency module 208 may be configured to determine the first switching frequency for each electric machine in real-time, as switching frequency module 208 collects/receives performance data during operation of each electric machine.

Once the first switching frequency has been determined, the second switching frequency may be determined, based on of the rotor speed of the electric machine collected with the performance data (Step 415). According to one embodiment, after collection of performance data, switching frequency module 208 may determine a second switching frequency based on rotor speed of an electric machine. For example, switching frequency module 208 may determine a second switching frequency based on the actual, commanded, or expected RPM of an electric machine, or some other measure of the rotation speed of the electric machine. The determination may be calculated based on a formula or model of an electric machine. The model may have been generated during commissioning of machine 100, may be a standard model for the sort of electric machine used, or may be a model updated by control system 140 as the performance of the electric machine changes. In another example, switching frequency module 208 may determine a second switching frequency of an electric machine from a two-dimensional map 320 in storage device 203, based on the data collected in step 405, including a rotor speed, such as RPM, of the electric machine. It is contemplated that switching frequency module 208 may be configured to determine the second switching frequency for each electric machine in real-time, as switching frequency module 208 collects performance data during operations of each electric machine.

Once the second switching frequency has been determined, the method may determine whether the first switching frequency is less that the second switching frequency (Step 420). According to one embodiment, control system 140 may use the first switching frequency to control the power converter if the first switching frequency is less than the second switching frequency. That is, control system 140 may use the switching frequency based on the current/torque of the electric machine. Control system 140 may use the second switching frequency to control the power converter if the second switching frequency is less than the first switching frequency. That is, control system 140 may use the switching frequency based on the rotor speed of the electric machine. In a further exemplary embodiment, if the first switching frequency is the same as the second switching frequency, either switching frequency may be used to by control system 140 to control the power converter. For example, if the first switching frequency is the same as the second switching frequency, then the last switching frequency used to control the power converter may be used to control the power converter. That is, the first or second switching frequency may be used, but not at the same value of the previous switching frequency. In another exemplary embodiment, the lower switching frequency may be determined based not only on a comparison of the values of the frequency, but also on a projected effect on the efficiency of the electric machine.

If the first switching frequency is less than the second switching frequency, control system 140 may set the power converter switching frequency equal to the first switching frequency (Step 425). According to one embodiment, switching frequency module 208 may set the power converter switching frequency equal to the first switching frequency. The power converter switching frequency may be used by control system 140 to control a power converter in power electronics system 120.

If the second switching frequency is less than the first switching frequency, control system 140 may set the power converter switching frequency equal to the second switching frequency (Step 430). According to one embodiment, switching frequency module 208 may set the power converter switching frequency equal to the second switching frequency. The power converter switching frequency may be used by control system 140 to control a power converter in power electronics system 120.

Control system 140 may be configured to store relevant performance data and other information in a storage device 203 (Step 435). The information stored may include one or more of the actual, commanded, or expected currents and/or torques and one or more of the actual, commanded, or expected RPM, or some other measure of the rotation speed of the electric machine, the first switching frequency, the second switching frequency, date, time, electric machine, power converter, and the power converter switching frequency. The stored data may be stored in a permanent file, or may be stored in revolving buffer, which can be transferred to a permanent file in the event of an anomaly associated with power electronics system 120 or control system 140. Switching frequency module 208 may wait a designated amount of time, and next execute Step 405.

While certain aspects and features associated with the method described above may be described as being performed by one or more particular components of control system 140, it is contemplated that these features may be performed by any suitable computing system. Furthermore, it is also contemplated that the order of steps in FIG. 4 is exemplary only and that certain steps may be performed before, after, or substantially simultaneously with other steps illustrated in FIG. 4. For example, in some embodiments, Step 435 may be omitted.

INDUSTRIAL APPLICABILITY

Methods and systems consistent with the disclosed embodiments may provide a solution for limiting thermal overload in power converters, particularly from exceeding a maximum switching frequency or exceeding a maximum current. A control system 140 that employs the processes and features described herein provides a protection strategy that reduces the risk of thermal overload of a power converter by determining a first switching frequency as a function of the current/torque of an electric machine, determining a second switching frequency as a function of the rotor speed of an electric machine, and setting the power converter switching frequency to the lesser of the first switching frequency and the second switching frequency, during real-time operations of the machine 100. Although the disclosed embodiments are described in connection with a power converter for an electric machine on machine 100, they may be applicable to any power converter that supplies an electric machine where it may be advantageous to provide a thermal overload protection strategy.

The presently disclosed system and method for determining a power converter's switching frequency may have several advantages. For example, the systems and methods described herein may provide both thermal overload protection from exceeding a maximum switching frequency or exceeding a maximum current. Additionally, the disclosed system and method does not require significant increased cost or complexity. For example, when the disclosed system and method is implemented on a machine 100, the process of flowchart 400 is relatively simple to implement, as many machines 100 may already have diagnostic systems that may monitor any power converters and/or electric machines present. Additionally, the presently disclosed system and method may require very little additional hardware than is already available on machine 100. Such additional hardware may be limited to a few sensors 150 and wires to connect sensors 150 to control system 140. Implementation of the disclosed system and method may include the limited additional costs of software to determine the first switching frequency and the second switching frequency, and to determine the lesser of the first switching frequency and the second switching frequency.

Further, in a power converter, generally the lower the switching frequency, the better the cooling and efficiency. By accounting for both the rotor speed and current/torque of the electric machine, and using the lesser of the two switching frequencies as the power converter switching frequency, the power converter may experience better cooling and efficiency.

It will be apparent to those skilled in the art that various modifications and variations can be made to the disclosed system and method without departing from the scope of the disclosure. Other embodiments of the present disclosure will be apparent to those skilled in the art from consideration of the specification and practice of the present disclosure. It is intended that the specification and examples be considered as exemplary only, with a true scope of the present disclosure being indicated by the following claims.

What is claimed is:

1. A method of controlling a power converter in an electric drive machine including an electric machine, the method comprising:
   determining a torque or electric current of the electric machine;
   determining a rotor speed of the electric machine;
   determining a first switching frequency based on the determined torque or electric current of the electric machine;
   determining a second switching frequency based on the determined rotor speed of the electric machine;
   comparing the first switching frequency to the second switching frequency; and
   selecting a power converter switching frequency from the lesser of the first switching frequency and the second switching frequency to control the power converter.

2. The method of claim 1, wherein determining the first switching frequency based on the torque or electric current of the electric machine includes using a two-dimensional map of the torque or electric current versus switching frequency.

3. The method of claim 1, wherein determining the second switching frequency based on the rotor speed of the electric machine includes using a two-dimensional map of the rotor speed versus switching frequency.

4. The method of claim 1, further including saving to a memory device the first switching frequency and the second switching frequency.

5. A system for selecting a switching frequency for a power converter in an electric drive machine including at least one electric machine, the system comprising:
- at least one power converter configured to provide power to the at least one electric machine;
- a controller electrically coupled to the at least one power converter, wherein the controller is configured to:
  - determine a torque or electric current of the at least one electric machine;
  - determine a rotor speed of the at least one electric machine;
  - determine a first switching frequency based on the determined torque or electric current of the at least one electric machine;
  - determine a second switching frequency based on the determined rotor speed of the at least one electric machine;
  - compare the first switching frequency and to the second switching frequency; and
  - select a power converter switching frequency from the lesser of the first switching frequency and the second switching frequency to control the at least one power converter.

6. The system of claim 5, wherein the controller is configured to determine the first switching frequency based on the torque or electric current of the electric machine using a two-dimensional map of torque or electric current versus switching frequency.

7. The system of claim 5, wherein the controller is configured to determine the second switching frequency based on the rotor speed of the electric machine using a two-dimensional map of rotor speed versus switching frequency.

8. The system of claim 5, wherein the controller is configured to switch a plurality of power transistors in the at least one power converter.

9. The system of claim 5, wherein the power converter coverts DC power into AC power.

10. An electric drive machine, comprising:
- a power source;
- at least one electric machine, each electric machine having at least one phase and a rotor speed sensor associated with each electric machine;
- at least one power converter, each power converter having at least one phase and a current sensor associated with each phase; and
- a controller electrically coupled to the at least one power converter, wherein the controller is configured to:
  - determine an electric current of the at least one electric machine based on a signal from the current sensor;
  - determine a rotor speed of the at least one electric machine based on a signal from the rotor speed sensor;
  - determine a first switching frequency based on the determined electric current of the at least one electric machine;
  - determine a second switching frequency based on the determined rotor speed of the at least one electric machine;
  - compare the first switching frequency and to the second switching frequency; and
  - select a power converter switching frequency from the lesser of the first switching frequency and the second switching frequency to control the at least one power converter.

11. The electric drive machine of claim 10, wherein the controller is configured to determine the first switching frequency using a two-dimensional map of torque or electric current versus switching frequency.

12. The electric drive machine of claim 11, wherein the controller is configured to determine the torque based on the electric current of the at least one electric machine.

13. The electric drive machine of claim 10, wherein the controller is configured to determine the second switching frequency based on the rotor speed of the at least one electric machine using a two-dimensional map of rotor speed versus switching frequency.

14. The electric drive machine of claim 10, wherein the controller is configured to switch a plurality of power transistors in the at least one power converter.

* * * * *